United States Patent Office 3,539,288
Patented Nov. 10, 1970

3,539,288
SYNTHETIC POLYAMIDE FIBER DYED WITH COPPER COMPLEX OF MONOAZO DYESTUFFS
Theodor Arthur Liss, Wilmington, and William Howells Vinton, Hockessin, Del., assignors to E. I. du Pont de Nemours and Company, Wilmington, Del., a corporation of Delaware
No Drawing. Original application Apr. 15, 1965, Ser. No. 448,278. Divided and this application May 16, 1968, Ser. No. 729,545
Int. Cl. D06p 1/10
U.S. Cl. 8—42        4 Claims

ABSTRACT OF THE DISCLOSURE

Synthetic polyamide fibers dyed in red to violet shades with 1:1 copper complexes of o,o'-dihydroxyazobenzenes.

CROSS REFERENCE TO RELATED APPLICATIONS

This application is a divisional application of U. S. Ser. No. 448,278, filed Apr. 15, 1965, and now abandoned.

This invention is directed to novel 1:1 copper complexes of o,o'-dihydroxyazobenzenes, which complexes dye polyamide fibers in red to violet shades having outstanding fastness and transfer properties.

The general problem of dying polyamide fibers in level shades is discussed by A. M. Schmutzler in "Textil-Praxis International," vol. 19, No. III, pages 119–123 (1964). It is clear from this article that both the 1:1 and 1:2 metal complex dyes known heretofore are characterized by their property of dyeing polyamide materials unevenly, that is, these dyes are known to make a heavy marking of differences that exist in the material. Thus, the polyamide fiber becomes streaky during dyeing. In view of this, it was not obvious that any 1:1 metalized dye should have good transfer properties on polyamide fibers. This Schmutzler cites "1:1 metal-complex dye-stuffs" in a table on page 121. He is surely commenting on commercial dyes. These are chromium containing dyes, and, as Zollinger (H. Zollinger, "Azo and Diazo Chemistry" (Interscience, N.Y., 1961)) clearly states, probably have sulfonic acid substituents. Thus, the 1:1 dyes known and used are wool dyes and are acid dyes in the normal sense; further, they have a cationic change associated with the metal. (Its +3 charge is not neutralized by the two negatively charged phenate groups.) Low pH is required to get them to exhause, as with many acid dyes.

In direct contrast to the 1:1 dyes commonly referred to by dyers in the trade, the dye complexes of the present invention are not charged, are disperse dyes (almost insoluble in water) and dye at a high pH.

The Zollinger reference above designated indicates that 1:1 metal complexes of copper and nickel are known, but all his discussion is of "studies" and "investigations" with these types; he doesn't indicate any commercial dyes are known. This indicates that Schmutzler was not referring to the herein described and claim 1:1 complex.

In the bulk dyeing of nylon carpet with dyes having poor transfer properties one observes a heavier application of dye at the sides of the piece as compared with the center. This is known in the trade as side-to-side as center shading. This is an acute problem with anionic 2:1 metal complex dyes, and is especially acute with acid dyes, such as the commercial 1:1 chromium metalized dyes and is solved by the novel dyes of the present invention which are characterized by their excellent transfer.

U.S. Pat. 2,669,561 discloses copper complexes of dichloro-o,o'-dihydroxyazobenzenes which complexes are soluble in common organic solvents with a brown color. The only main example disclosure of a dichloro Cu-complex is found in Example 6, according to which the monoazo dye is refluxed for about seven hours

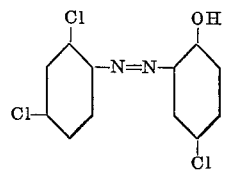

with copper sulfate in aqueous alcohol containing NaOH. The end product is described as the copper complex of the monoazo dye.

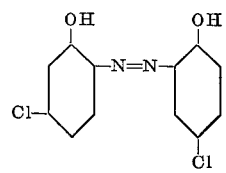

The Cu-complex is ". . . a brown lacquer dyestuff fast to light."

It has been found that the brown dye of said Example 6, upon chromatographic separation, is really a mixture of products. Furthermore, when applied to nylon, the brown dye exhibits poor lightfastness.

In contrast with this patent disclosure, the novel dyes of the present application are uniform 1:1 copper complexes which are obtained by reacting an o-alkoxy-o'-hydroxy monoazo compound with a copper salt in the presence of a heterocyclic nitrogen base; these novel dyes color BCF nylon in red shades having excellent lightfastness.

U.S. Pat. 1,940,066 discloses the process of forming 1:1 copper complexed azo dyes by reacting a water-soluble o-alkoxy-o'-hydroxy azo compound with a copper salt in the presence of an acqueous solution of an organic base such as pyridine, hexahydroethylaniline, dimethylamine, etc.

In the present process in which an alkoxy group is cleaved, however, the unmetalized starting materials are water-insoluble, and the nitrogen bases are limited to heterocyclic N-compounds.

It is, therefore, an object of the present invention to provide 1:1 metalized azo dyes of red to violet shades which exhibit outstanding fastness (light, ozone and fumes of nitrogen oxides) and transfer properties on polyamide fibers. A particular object is to provide such dyes which possess a combination of excellent lightfastness and good transfer properties on polyamide fibers of the bulked continuous filament (BCF) nylon type which is commonly used in the trade for nylon carpet.

These and other objects of the invention will be apparent from the following description and claims.

It has been discovered that 1:1 copper complexes of certain o,o'-dihydroxyazobenzenes dye polyamide fibers in red to violet shades which are particularly characterized by their excellent lightfastness and transfer properties. This result was quite unexpected for the following reasons: (1) it is well known that 1:2 Cr or Co:azo dye complexes have poor levelling and transfer properties on polyamide fibers, and (2) it was found that 1:1 copper complexes of the closely related o,o'-dihydroxyphenylazonaphthalene compounds have poor transfer properties.

More specifically, the present invention is directed to novel red to violet coloring matter having a single absorption maximum in the visible portion of the spectrum and having the structure:

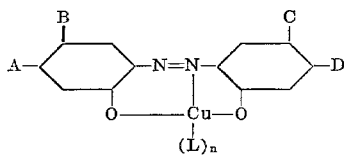

which is monosubstittued at B (A=C=D=H) by Cl, NHCOR, COR, COOR or CONH$_2$; disubstituted at B and C (A=D=H) by B=Cl when C=Cl, R, NHCOR, COR, CONH$_2$, COOR, SO$_2$C$_2$H$_4$OH, SO$_2$R, SO$_2$NH$_2$ or SO$_2$NHC$_2$H$_4$OH; disubstituted at A and C (B=D=H) by A=Cl when C=Cl, R, NHCOR, COR, CONH$_2$, COOR, SO$_2$C$_2$H$_4$OH, SO$_2$R, SO$_2$NH$_2$ or SO$_2$NHC$_2$H$_4$OH; trisubstituted at A, B and C (D=H) by A=Cl, B=CH$_3$, C=Cl; trisubstituted at A, B and D (C=H) by A=Cl, B=CH$_3$, D=Cl; where R is a short chain alkyl C$_{1-3}$, L is a nitrogen base ligand, and $n$ is 0 or 1.

A preferred embodiment is that of a red coloring matter having a single absorption maximum in the visible portion of the spectrum when measured in dimethylformamide at 540 millimicrons and in nylon at 544 millimicrons and having the structure heretofore defined wherein A=D=H, B=C=Cl, and L is a methyl pyridine. Another preferred embodiment is that of a red coloring matter having a single absorption maximum in the visible portion of the spectrum when measured in dimethylformamide at 530 millimicrons and in nylon at 530 millimicrons, and having the structure heretofore defined wherein B=D=H, A=C=Cl, and L is a methyl pyridine.

The present invention also relates to a process for the manufacture of a red to violet coloring matter having a single absorption maximum in the visible portion of the spectrum, and having the structure heretofore defined, L being a heterocyclic nitrogen base, whereby one mole of an azobenzene of the structure:

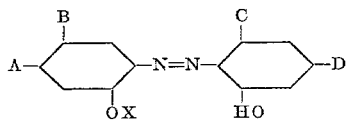

where A, B, C and D are defined as above, X is a short chain alkyl group, said azo compound being free of sulfonic and carboxylic acid groups, is heated with at least one mole of a copper yielding agent in an aqueous medium at about 60° C. to 100° C. in the presence of at least two moles of a heterocyclic nitrogen base until the formation of a 1:1 Cu:azo dye complex is essentially complete, followed by isolation of the dye.

In an alternate process, one mole of an azobenzene of the structure:

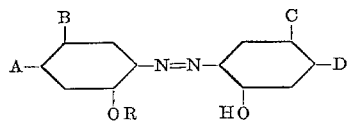

where A, B, C and D as heretofore defined is heated with at least one mole of a copper yielding agent in an aqueous or solvent medium at ambient to warm temperatures, and optionally in the presence of at least one mole of a nitrogen base until the formation of a 1:1 Cu:azo dye complex is essentially complete, followed by isolation of the dye.

Representative examples further illustrating the invention follow.

EXAMPLE 1

To a solution of 2.8 parts of the azo compound, 5-chloro-o-anisidine (NH$_2$=1)→p-cresol in 50 parts of pyridine at 50° C. was added 25 parts of water, followed by a solution of 3.5 parts of cupric sulfate pentahydrate in 20 parts of water plus 5 parts of pyridine. The temperature was raised to and maintained at 80° C. for 16 hours. The solid was filtered off at room temperature, washed with a 1:1 pyridine: water mixture, then with water and finally with acetone. The dried product was obtained in excellent yield. This complex was purified by continuous extraction wtih acetone in a Soxhlet apparatus. Analyses found for C, H, N, Cl and Cu were in agreement with those required by the following structure:

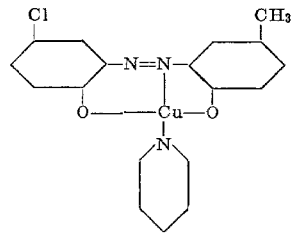

It is a dark red crystalline compound which dissolves in pyridine to give a red solution. It dyes nylon in a red lightfast shade from a disperse dyebath.

The pyridine employed in this example may be replaced with 50 parts of any of the pyridine bases named in Example 4 to give similar results.

EXAMPLE 2

To a solution of 3 parts of the azo compound, 5-chloro-o-anisidine (NH$_2$=1)→p-chlorophenol in 50 parts of pyridine at 50° C. was added a solution of 3.5 parts of cupric sulfate pentahydrate in 20 parts of water and 5 parts of pyridine. The resulting mixture was heated at 90° C. for two hours. Completeness of the metalization reaction is followed by thin layer chromatography. As reaction proceeds, the yellow band of the starting material disappears and after complete 1:1 metalization a single red band is observed. The solid was filtered off at 40° C. in excellent yield and was washed with acetone and dried. The resulting 1:1 Cu:azo dye complex was found to have the structure shown for the dye obtained in Example 1 except that it contains a chlorine atom in place of the methyl group. The two dyes have similar properties; the dye of the present example has a bluer red shade and exhibits a single absorption maximum in the visible portion of the spectrum, when measured in dimethylformamide, at 540 millimicrons and in nylon at 544 millimicrons.

In the above example, other nitrogen base compounds such as alpha-, beta-, or gamma-picoline and their mixtures can be used in place of or in admixture with pyridine to obtain similar results.

When the solution of cupric sulfate pentahydrate in 20 parts of water, employed in this example, was replaced by 1.5 parts of cuprous chloride, similar results were obtained. In this instance the 1:1 complex was isolated after addition of 15 parts of water.

EXAMPLE 3

A mixutre of 15 parts of the azo compound, 5-chloro-o-anisidine (NH$_2$=1)→p-chlorophenol, 18 parts of pyridine, 40 parts of formamide, and 15 parts of sodium acetate trihydrate was heated to 85° C. A solution of 25 parts of cupric chloride dihydrate in 30 ml. of water was then slowly added. The resulting mixture was heated at 95° to 100° C. for 10 hours. To the reaction mixture was then added 30 ml. of water at 80° to 85° C. The solid was filtered off, reslurried in water, filtered off, and washed with water. The solid was purified by recrystallization from a 1:1 pyridine: water mixture. It is identical with the product of Example 2.

When the formamide used in the present example is replaced by related solvents such as: N-methylformamide, N,N-dimethylformamide, acetamide, N-methylacetamide, N-ethylacetamide, N,N-dimethylacetamide, N,N-diethylacetamide, pyrrolidone, N-methylpyrrolidone, or mixtures of these solvents, similar results are obtained; also the sodium acetate may be replaced by sodium formate, sodium propionate, trisodium phosphate or mixtures of the acid binders. Copper yielding agents other than cupric chloride may be employed in the present example. When cuprous chloride is employed, it is preferred to add it in powder form. Also, pyridine may be replaced by other heterocyclic nitrogen bases as described below. It will be understood that the amounts of the solvents and acid binders may be increased or decreased to satisfy the requirements for smooth agitation, completeness of reaction and reaction rate. Much larger amounts of solvents and acid binders may be employed in the present example, but, generally, the larger amounts are not required.

EXAMPLE 4

A solution of 3.4 parts of cupric chloride dihydrate in 10 parts of water and 40 parts of 2-aminoethanol was added dropwise at room temperature to a solution of 2.8 parts of 5,5'-dichloro-2,2'-dihydroxy azobenzene (prepared by stirring one part of the copper complex produced in Example 2 in ten parts of concentrated $H_2SO_4$ for 15 minutes and adding this mixture to water) in 50 parts of 2-aminoethanol. The solid which formed was filtered off and washed with a 1:1 2-aminoethanol-water mixture and then with water. The dried product was obtained in good yield. Elemental analysis indicates the complex to have the structure:

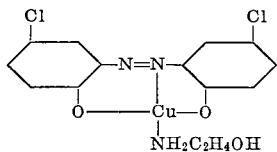

In the above example similar amounts of other amines such as ammonium hydroxide (about 15%) and ethylenediamine can be used in place of the 2-aminoethanol. Imidazole complexes are prepared similarly, using methanol as reaction solvent and imidazole as the heterocyclic nitrogen base. Likewise, pyridine, a methylpyridine, quinoline or a methylquinoline may be used to form the corresponding liganded complexes.

EXAMPLE 5

(a) To a solution of 3.2 parts of the azo compound, o-anisidine→4'-hydroxyacetanilide in 50 parts of pyridine at 50° C. was added in a solution of 3.5 parts of cupric sulfate pentahydrate in 20 parts of water and 5 parts of pyridine. The mixture was heated at 85° to 95° C. for two hours, then cooled to room temperature, after which 180 parts of water were added slowly. The solid which formed was filtered off, washed with a 5:1 water:pyridine solution then with water and dried. A good yield was obtained. The product was purified by recrystallization from a 1:1 pyridine:water solution. Elemental analyses were in agreement with those required for the structure:

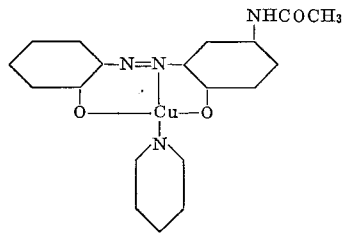

(b) A similar dye is obtained when the metalized azo compound used in part (a) of this example is replaced by a chemical equivalent amount of the azo compound, o-anisidine→4'-hydroxybutyranilide.

EXAMPLE 6

(a) To a solution of 2.9 parts of the azo compound, 5-chloro-o-anisidine ($NH_2=1$)→4'-hydroxyacetanilide in 50 parts of pyridine at 50° C. was added a solution of 3.5 parts of cupric sulfate pentahydrate in 20 parts of water plus 5 parts of pyridine. The mixture was warmed at 85° to 95° C. for two hours, then cooled to room temperature, after which 25 parts of water were added. The solid was filtered off in good yield, washed with 1:1 pyridine:water solution and then with water. The 1:1 copper:azo dye complex liganded with pyridine was continuously extracted with methanol in a Soxhlet apparatus. This operation removed the pyridine ligand. Analyses found for C, H, N and Cl were in agreement with those required by the following structure:

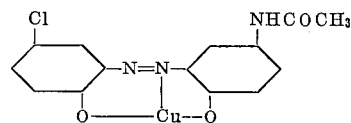

This dye, as well as its amine liganded form, dyes nylon in fast violet shade from a disperse dyebath. It has outstanding transfer properties.

(b) A mixture of 7 parts of 5,5'-dichloro-2,2'-dihydroxyazobenzene and 1600 parts of ethyl alcohol was heated at reflux while a solution of 7 parts of cupric chloride dihydrate in 8 parts of ethyl alcohol was added. After 15 min. at refluxing temperature the mixture was cooled to room temperature and the 1:1 copper:azo dye complex was filtered off in excellent yield. Elemental analysis of the complex was in agreement with that required by the structure:

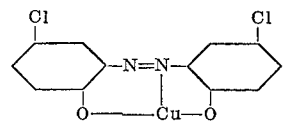

This dye and those of Examples 2 and 3 dye nylon in blue red shades from a disperse dyebath, and exhibit similar fastness and transfer properties.

The monazo dyes obtained from the diazo and coupling components listed in Table I, or their analogs, may be coppered as described in Examples 1 to 3 to give 1:1 copper complexes which dye nylon in shades as shown in Table II.

TABLE I

| Ex. No. | Diazo component | Coupling component |
|---|---|---|
| 7 | o-Phenetidine | p-Chlorophenol. |
| 8 | o-Anisidine | 4'-hydroxypropiophenone. |
| 9 | 5-chloro-o-anisidine ($NH_2=1$) | p-Propylphenol. |
| 10 | do | 4'-hydroxyacetophenone. |
| 11 | 5-chloro-o-phenetidine ($NH_2=1$) | p-Hydroxybenzamide. |
| 12 | 5-chloro-o-anisidine($NH_2=1$) | Ethyl p-hydroxybenzoate. |
| 13 | do | 2-(p-hydroxyphenylsulfonyl) ethanol. |
| 14 | do | p-(Methylsulfonyl)phenol. |
| 15 | do | p-Hydroxybenzenesulfonamide. |
| 16 | do | p-Hydroxy-N-(2-hydroxyethyl)benzenesulfonamide. |
| 17 | do | 3-chloro-p-cresol(OH=1). |
| 18-28 | 4-chloro-o-anisidine($NH_2=1$) | Couplers 7-17. |
| 29 | 4-chloro-o-anisidine($NH_2=1$) | 4'-hydroxyacetanilide. |
| 30 | 4-chloro-o-anisidine($NH_2=1$) | 4'-hydroxybutyranilide. |
| 31 | o-Anisidine | Methyl p-hydroxybenzoate. |
| 32 | do | Isopropyl p-hydroxybenzoate. |
| 33 | do | p-Hydroxybenzamide. |

The substituents A, B, C, and D listed in Table II, correspond to those shown in the structure:

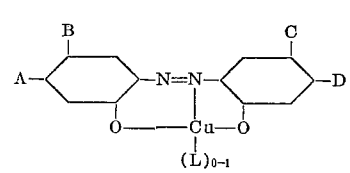

TABLE II

| Ex. No. | A | B | C | D | Shade |
|---|---|---|---|---|---|
| 1 | H | Cl | CH₃ | H | Red. |
| 2,3,4,6b | H | Cl | Cl | H | Blue-red. |
| 5a | H | H | NHCOCH₃ | H | Do. |
| 5b | H | H | NHCOC₃H₇ | H | Do. |
| 6a | H | Cl | NHCOCH₃ | H | Violet. |
| 7 | H | H | Cl | H | Red. |
| 8 | H | Cl | COC₂H₅ | H | Do. |
| 9 | H | Cl | C₃H₇ | H | Do. |
| 10 | H | Cl | COCH₃ | H | Do. |
| 11 | H | Cl | CONH₂ | H | Do. |
| 12 | H | Cl | COOC₂H₅ | H | Do. |
| 13 | H | Cl | SO₂C₂H₄CH | H | Do. |
| 14 | H | Cl | SC₂CH₃ | H | Do. |
| 15 | H | Cl | SO₂NH₂ | H | Do. |
| 16 | H | Cl | SO₂NHC₂H₄OH | H | Do. |
| 17 | H | Cl | CH₃ | Cl | Do. |
| 18 | Cl | H | Cl | H | Do. |
| 19 | Cl | H | COC₂H₅ | H | Do. |
| 20 | Cl | H | C₃H₇ | H | Do. |
| 21 | Cl | H | COCH₃ | H | Do. |
| 22 | Cl | H | CONH₂ | H | Do. |
| 23 | Cl | H | COOCH₃ | H | Do. |
| 24 | Cl | H | SO₂C₂H₄OH | H | Do. |
| 25 | Cl | H | SO₂C₂H₅ | H | Do. |
| 26 | Cl | H | SO₂NH₂ | H | Do. |
| 27 | Cl | H | SO₂NHC₂H₄OH | H | Do. |
| 28 | Cl | H | CH₃ | Cl | Do. |
| 29 | Cl | H | NHCOCH₃ | H | Blue-red. |
| 30 | Cl | H | NHCOC₃H₇ | H | Do. |
| 31 | H | H | COOCH₃ | H | Red. |
| 32 | H | H | COOC₃H₇ | H | Do. |
| 33 | H | H | CONH₂ | H | Do. |

The red dye of Example 18 exhibits a single absorption maximum in the visible portion of the spectrum, when measured in dimethylformamide, at 530 millimicrons and in nylon at 530 millimicrons.

EXAMPLE 34

Dyeing nylon with the 1:1 Cu:azo dyes described herein:

A dyebath containing 9,000 parts of water was treated with 30 parts of tetrasodium pyrophosphate, 18 parts of nonionic dispersant (the condensation product of a long chain alkyl amine with ethylene oxide), and 7.5 parts of anionic dispersant (long chain hydrocarbon sodium sulfonate), and then adjusted to pH 9–9.2 with phosphate buffers. Two hundred parts of BCF nylon yarn were introduced, after which 0.25 part of the dye of Example 2 was added in a finely divided state. The bath temperature was raised to 208° F. (98° C.) at the rate of 3°/min. The pH was maintained at 9.0 by the addition of buffer. At the end of one hour the fiber was removed and rinsed with tap water. A level blue-red dyeing was obtained which exhibited excellent lightfastness, as well as excellent fastness to ozone and NO₂. The BCF nylon yarn is 3700-denier, 204-trilobal, continuous filament, jet-bulked yarn, melt-spun from poly(hexamethylene adipamide) flake. The yarn is jet-bulked with the jet taught by Hallden et al. in U.S. Pat. 3,005,251.

When the process of this example was applied to the dyeing of nylon tufted onto a jute backing (nylon carpet), using about 300 parts of carpet, as performed in beck dyeing equipment, similarly good results were obtained.

The dyes of this invention are also useful for dyeing other forms of nylon, such as carpets tufted from nylon staple yarn, or upholstery woven from either bulked or nonbulked nylon.

The criticality of copper as the metal, the choice of 1:1 as contrasted with 1:2 complexes, and the importance of limiting the size of the molecule to azobenzenes have been discussed above. In order to achieve the objects of the present invention, it is also necessary to employ the azo starting materials which are free of water solubilizing groups such as sulfo and carboxy groups.

The alkyl group of the o-alkoxy-o'-hydroxyazobenzenes is not critical, any short chain alkoxy group being satisfactory. The ring substituted ortho-anisidines are the generally preferred diazo components because they are readily available. The corresponding orthophenetidines may also be used.

The azo starting materials used in the preferred process of the present invention are the o-alkoxy-o'-hydroxyazobenzenes. It is not feasible to prepare o,o'-dihydroxyazobenzenes by diazotizing and coupling the substituted o-aminophenols to the substituted phenols. The diazonium compounds of the o-aminophenols are the socalled diazo oxides and are very weak diazos. Therefore, in the preferred process, o-alkoxyanilines are used to prepare the metalizable starting materials. During metalization, it is believed that an intermediate 1:2 Cu:azo dye complex is formed, represented by the structure:

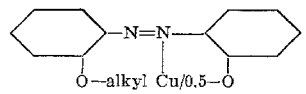

Since, in the products of the present invention, said intermediate complexes have no solubilizing groups, they are very insoluble in water and most organic solvents. The use of aqueous ammonium hydroxide, alcoholic sodium hydroxide, etc., are, therefore, not effective in carrying out the metalization. This problem is solved by using either an excess of a heterocyclic nitrogen base as solvent, base, and liganding agent (Examples 1 and 2) or by using at least two moles (per mole of azo compound) of a heterocyclic nitrogen base together with a solvent such as formamide and a proton acceptor such as sodium acetate as illustrated in Example 3. Suitable heterocyclic nitrogen bases are those which contain the ring nitrogen atom —N= and are illustrated by pyridine, the mono- and di-methylpyridines such as alpha-, beta- or gamma-picoline, or the lutidines, quinoline, methylquinolines, and the like.

In an alternate process (illustrated by Example 4) the o,o'-dihydroxyazobenzene is employed as starting material for the metalization reaction. In this modification of the invention, the solvent effect is not as critical and a large number of nitrogen bases may be employed as liganding agents. These include ammonia, alkyl amines such as methylamine, ethylamine, diethylamine or propylamine; aminoalkanols such as 2-aminoethanol or 3-aminopropanol; polyamies such as ethylenediamine or 1,3-propanediamine; aralkylamines such as benzylamine; arylamines such as aniline, para-toluidine or the anisidines.

The temperature at which 1:1 coppering of the o-alkoxy-o'-hydroxyazobenzene begins is in the neighborhood of 60° C. Operating in a large excess of a heterocyclic nitrogen base, as in Example 2, the coppering is completed within an hour at 90° C. Although temperatures above 100° C. may be used under pressure for predominantly aqueous reaction systems, it is preferred to operate within the range of about 60° to 100° C. in ordinary equipment. When coppering the o,o'-dihydroxyazobenzenes much lower temperatures may be employed (Example 4) such as room temperature or slightly higher.

The copper yielding agent employed in the metalization reaction is a mono-or di-valent copper compound such as cuprous chloride, cupric chloride, cupric sulfate, copper acetate or copper nitrate. Common water soluble hydrated salts of copper, conveniently available in the trade, may be employed. Theoretically, the amount of copper compound employed is equivalent to one atom of copper per mole of azo compound. This amount is operable, however, it is preferred to use about 1.2 to 3 times the theoretical amount of copper compound to assure complete reaction to the 1:1 complex.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof.

The embodiments of the invention in which an exclusive property or privilege is claimed are as follows:

1. Synthetic polyamide fibers dyed with a 1:1 copper complex red to violet coloring matter having a single absorption maximum in the visible portion of the spectrum and having the structure

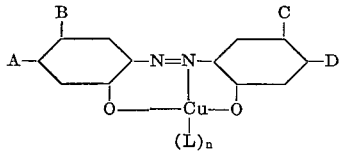

wherein (1) A, C and D are H when B is a member selected from the group consisting of Cl, NHCOR, COR, COOR, and $CONH_2$; when (2) A and D are H, B is Cl and C is a member selected from the group consisting of Cl, R, NHCOR, COR, $CONH_2$, COOR, $SO_2C_2H_4OH$, $SO_2R$, $SO_2NH_2$ and $SO_2NHC_2H_4OH$; when (3) B and D are H, A is Cl and C is a member selected from the group consisting of Cl, R, NHCOR, COR, $CONH_2$, COOR, $SO_2C_2H_4OH$, $SO_2R$, $SO_2NH_2$ and $SO_2NHC_2H_4OH$; when (4) D is H, A is Cl, B is $CH_3$ and C is Cl; when (5) C is H, A is Cl, B is $CH_3$ and D is Cl; wherein said R is a $C_{1-3}$ alkyl; L is a nitrogen base ligand selected from the group consisting of heterocyclics containing the ring nitrogen atom $-N=$, arylamines, aralkylamines, polyamines, aminoalkanols, alkylamines, ammonia and ammonium hydroxide and $n$ is selected from 0 to 1.

2. The dyed synthetic fibers of claim 1 in which the fibers are of the bulked continuous filament nylon type.

3. The dyed synthetic polyamide fibers of claim 1 wherein A=C=D=H, B=Cl and L is picoline.

4. The dyed synthetic polyamide fibers of claim 3 in which the fibers are of the bulked continuous filament nylon type.

References Cited

UNITED STATES PATENTS

| | | | |
|---|---|---|---|
| 1,940,066 | 12/1933 | Stusser | 266—148 |
| 2,669,561 | 2/1954 | Schmelzer et al. | 260—149 |

OTHER REFERENCES

Zollinger, Azo & Diazo Chem., 1961, p. 358–359.

Schmutzler, Textile Tech. Digest, vol. 21, #9, September 1964 (4950).

GEORGE F. LESMES, Primary Examiner

T. J. HERBERT, JR., Assistant Examiner

U.S. Cl. X.R.

8—178; 260—146, 149